US012771696B1

(12) United States Patent
Rastogi et al.

(10) Patent No.: US 12,771,696 B1
(45) Date of Patent: Oct. 20, 2026

(54) ROLE MANAGEMENT FRAMEWORK USING GRAPH ANALYTICS

(71) Applicant: MORGAN STANLEY SERVICES GROUP INC., New York, NY (US)

(72) Inventors: Akriti Rastogi, Edison, NJ (US); Madhur Jain, Bengaluru (IN)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 19/379,480

(22) Filed: Nov. 4, 2025

(51) Int. Cl.
*H04L 9/40* (2022.01)

(52) U.S. Cl.
CPC .................................. *H04L 63/105* (2013.01)

(58) Field of Classification Search
CPC .................................................... H04L 63/105
See application file for complete search history.

(56) References Cited

U.S. PATENT DOCUMENTS 7,870,156 B2 1/2011 Rutter et al.
9,846,847 B2 12/2017 Rutter et al.
11,227,055 B1 1/2022 Badawy et al.
2005/0138061 A1 6/2005 Kuehr-McLaren et al.
2012/0042354 A1 2/2012 Vitiello et al.
2012/0246098 A1 9/2012 Chari et al.
2016/0315965 A1 10/2016 Sastry et al.
2016/0379001 A1* 12/2016 Eska .................... G06Q 30/016 726/4
2019/0230088 A1* 7/2019 Rice ....................... G06F 21/604
2020/0059476 A1* 2/2020 Anderson ........... G06F 16/2237
2020/0242536 A1* 7/2020 Schwantes .............. G06F 17/16
2021/0218748 A1 7/2021 Morin et al.
2022/0086162 A1* 3/2022 Badawy ................ H04L 63/105
2022/0200995 A1 6/2022 Morin et al.
2023/0035335 A1* 2/2023 Badawy ................... G06N 5/01
2023/0114226 A1* 4/2023 Gauldin ......... G06Q 10/063112 705/7.14
2024/0073216 A1* 2/2024 Ho ........................ H04L 63/102
2024/0143798 A1* 5/2024 Eberlein ............... G06F 21/604
2025/0184406 A1* 6/2025 Schenkelman ......... H04L 67/55

* cited by examiner

*Primary Examiner* — Chau Le
(74) *Attorney, Agent, or Firm* — WEITZMAN LAW OFFICES, LLC

(57) ABSTRACT

An identity and access management method for role mining is disclosed, involving storing in a database data including at least one of user identity attributes, enterprise roles, entitlements for each role, users for each role, resource-usage events, and key performance indicators. A processor-based role design and calibration engine retrieves a set of roles, and the processor computes, for each role, key performance indicators including at least one of in-role access percentage, out-of-role access percentage, missing entitlement count, unused entitlement count, or user count. A role quality score is derived for each role using the indicators. If the score is equal to or above a threshold, the role is kept and the indicators stored in the database. If the score is below the threshold, the method mines for potential new roles, compares them to existing roles, and proposes at least one change. A corresponding system is also disclosed.

16 Claims, 10 Drawing Sheets

300

301

Number of Users: 64

| ER Name 302 | ER ID 303 | In-Role Access 304 | OOR Access 305 | MER Access 306 | Unused Access 307 | Users in ER 308 | Insights 310 |
|---|---|---|---|---|---|---|---|
| Complex Risk Officer | 21 | 80% | 20% | 1 | 2 | 6 | Map Entitlements to ER (2)<br>Unmap Users from ER (1)<br>Unmap Entitlements from ER (2) |
| Complex Manager Assistant | 3457 | 75% | 25% | 6 | 7 | 20 | Map Entitlements to ER (4)<br>Unmap Entitlements from ER (2)<br>Map Users to ER (2) |
| Complex Business Development Officer | 4373 | 80% | 20% | 2 | 5 | 7 | Merge Duplicate/Similar role |
| Complex Business Service Officer | 5673 | 70% | 30% | 9 | 5 | 12 | Decommission role |

| User Group (Dept_title) | In-Role Access | OOR Access | MER Access | Users |
|---|---|---|---|---|
| Private_wealth_mangement_analsyt | 90% | 10% | 0 | 16 |
| Private_wealth_mangement_manager | 80% | 20% | 0 | 3 |

320

FIG. 3

ROLE MANAGEMENT FRAMEWORK USING GRAPH ANALYTICS

TECHNICAL FIELD

The present technology relates to computer security and, more particularly, to access control in a computer network.

BACKGROUND

In Identity Access Management ("IAM"), a role is an aggregation of entitlements, privileges or access rights that allow authentication authorization to access one or more of systems, applications, directories, documents, accounts, etc. across an enterprise, and to perform at least one specific action therein. The roles thus constructed are then assigned to qualifying users to give them all associated accesses in a single act of association instead of having to grant each individual user access one by one. A user is defined as anybody from the internal workforce of the enterprise. Typically, each user within an enterprise will be assigned one role. Theoretically, the minimum number of users per role is two, but typically there must be three or four users per role to justify the existence of a role. This access granting model, called "Role Based Access Control" ("RBAC"), allows for operationalization of complex access control models, which can then be used to automate large parts of access provisioning and deprovisioning.

Known IAM solutions offer role mining capability or other role assessment capabilities whereby collections of entitlements (i.e., roles) may be ascertained from identity management data associated with the enterprise. Certain role mining solutions may employ the use of information technology roles, which can be defined as collections or patterns of access entitlements that can be determined based on commonality of these particular groupings or business units (e.g., departments or locations) within the enterprise.

In an enterprise, there may be one or more users who do not satisfy the defining commonality criteria for any role and, therefore, are not a member of any role. Such users are known as outliers and may be individually assigned one or more entitlements by their supervisor (e.g., department head or location manager) or the human resources ("HR") department. Experience has shown that in large enterprises, between 5%-10% of the users are outliers. Similarly, certain users within a role may be individually assigned additional entitlements by their manager or the HR department.

One goal of IAM is to help operators of the IAM system identify and mitigate risks associated with access management that may result as an outgrowth of the evolution of roles within an enterprise over time. However, the sheer amount of data to be parsed in performing this task makes it impossible to be accomplished manually by a human.

SUMMARY

This disclosure describes solutions that provide significant advances in addressing the aforementioned problems.

The subject technology includes an automated Role Design and Calibration Engine to create and manage roles. The enterprise roles will be created based on users' access. The Role Design and Calibration Engine will automatically determine the quality of roles within a department of the enterprise and recommend the addition or removal of entitlements within roles in order to mitigate out-of-role access and improve role quality. Additionally, the Role Design and Calibration Engine recommends a mapping of roles to users based on their entitlements.

One aspect of this disclosure involves an identity and access management method for role mining, assessing the quality of existing roles on a regular periodic basis, and based on the results of the periodic quality assessment, altering the existing role, decommissioning the existing role and/or creating a new role, as necessary. The method includes storing, in a database, data including at least one of user identity attributes, enterprise roles, entitlements for each enterprise role, users for each enterprise role, resource-usage events, and key performance indicators, retrieving, using a processor-based role design and calibration engine, a set of enterprise roles from the database, computing using the processor and data from the database, for each enterprise role, key performance indicators including at least one of an in-role access percentage, an out of role access percentage, a missing entitlement count, an unused entitlement count, or a user count, and deriving, for each enterprise role, a role quality score, using the key performance indicators. If the role quality score of an enterprise role is equal to or above a threshold, the enterprise role will be kept and the key performance indicators will be stored in the database. If the role quality score of one or more enterprise roles of the set of enterprise roles is below the threshold, mining for one or more potential new enterprise roles, comparing the one or more potential new enterprise roles to the set of enterprise roles, and proposing at least one change based on a result of the comparison.

Another aspect of this disclosure involves an identity and access management system for role mining, assessing the quality of existing roles on a regular periodic basis, and based on the results of the periodic quality assessment, altering the existing role, decommissioning the existing role and/or creating a new role, as necessary. The system includes a database configured to store data including at least one of user identity attributes, enterprise roles, entitlements for each enterprise role, users for each enterprise role, resource-usage events, and key performance indicators, and a role design and calibration engine including a processor and non-transitory memory coupled to the processor. The non-transitory memory contains programming that will cause the processor to retrieve a set of enterprise roles from the database, compute, using data from the database, for each enterprise role, key performance indicators including at least one of an in-role access percentage, an out of role access percentage, a missing entitlement count, an unused entitlement count, or a user count, and derive, for each enterprise role, a role quality score, using the key performance indicators. If the role quality score of an enterprise role is equal to or above a threshold, the enterprise role will be kept and the key performance indicators will be stored in the database. On the other hand, if the role quality score of one or more enterprise roles of the set of enterprise roles is below the threshold, the role design and calibration engine will mine for one or more potential new enterprise roles, compare the one or more potential new enterprise roles to the set of enterprise roles, and propose at least one change based on a result of the comparison.

BRIEF DESCRIPTION OF THE DRAWINGS

This disclosure is further described in the detailed description that follows, with reference to the drawings, wherein the same reference numbers appearing in the various drawings and description designate corresponding or like elements among the different views. Other aspects, features and advantages will become more fully apparent from the following detailed description, the appended claims, and the accompanying drawings (which are provided solely for purposes of illustration without restricting the scope of any embodiment), of which:

FIG. 3 illustrates one simplified example of a user interface that can be used for automated role assessment within the system of FIG. 1;

DETAILED DESCRIPTION

Users are employees of an enterprise and may access resources of the enterprise to perform functions associated with their jobs, obtain information about the enterprise and its products, services and financial information, enter or manipulate information regarding the same, or generally to perform any task, activity or process related to the enterprise. In order to accomplish their responsibilities and job assignments, users may have entitlements to access resources of enterprise. These entitlements may give rise to risk of negligent or malicious use of resources.

Access to sensitive and/or financially valuable information can allow negligent or malicious activities to harm the enterprise. Access risks may result from a user having an entitlement with which the user can access resources that the particular user should not have access to. Access risks may also arise from enterprise roles that have shifted, changed, evolved, etc., thereby causing entitlements to no longer be optimally distributed among various users.

Figure 1:
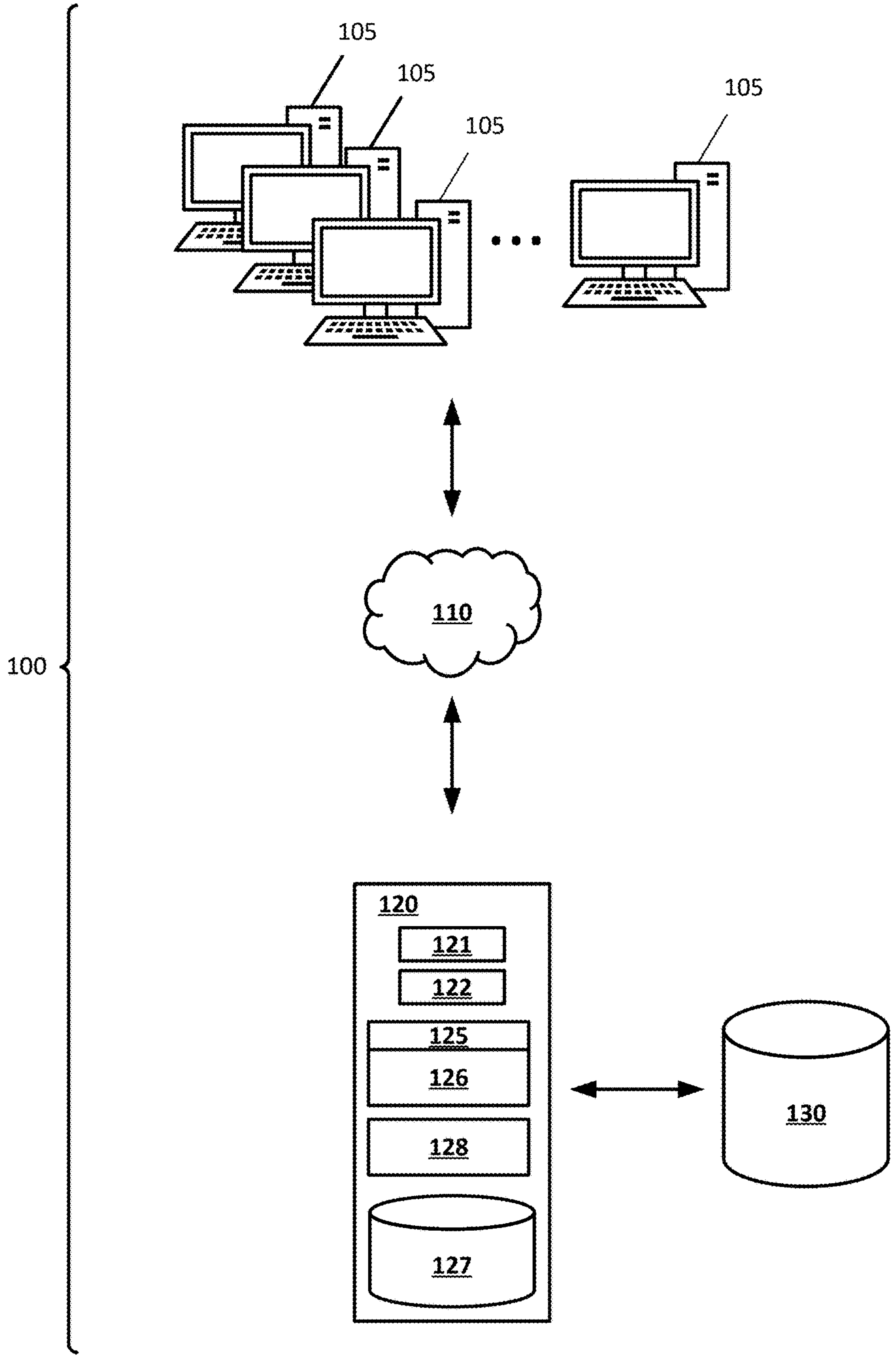
FIG. 1 illustrates, in simplified form, one representative example of a system of computing devices implementing the teachings herein, which are used to assist in the mining and assessment of roles associated with the identity management data associated with an enterprise, and the modification of existing roles, the creation of new roles, and the decommissioning of existing roles based on the results of the assessment.

FIG. 1 illustrates, in simplified form, an enterprise networked system 100 which is suitable for implementing variants of the present technology, as described herein, to assist in the mining and assessment of roles associated with the identity management data associated with an enterprise, the modification of existing roles, the creation of new roles, and the decommissioning of existing roles. The enterprise networked system 100 may include a number of computing devices 105 or applications executable therein that may be coupled to each other or other resources over an intranet computer network 110. Enterprise networked system 100 may include a number of resources, various resource groups and users associated with the enterprise. Users may have various roles, job functions, responsibilities, etc., to perform within various processes or tasks associated with enterprise networked system 100.

To accomplish different functions, different users may have differing access entitlements to differing resources. A Role Design and Calibration Engine 120 is implemented in the system 100 and configured to assist in managing the entitlements assigned to various users and more generally in managing and assessing access risks in the enterprise networked system 100. The Role Design and Calibration Engine 120 comprises an operating system 125, at least one processor 126, a non-transitory storage 127, containing program instructions executable by the at least one processor to effect operations such as described herein, and RAM 128.

A role within the context of the Role Design and Calibration Engine 120 is a collection of entitlements. To facilitate assignment of entitlements, the enterprise may define roles through the Role Design and Calibration Engine 120 using known data mining methodologies such as clustering algorithms (e.g., K-means, K-medians, etc.) and graph partitioning. The roles may then be assigned to those users that should be assigned a particular role. By assigning a role to a user using the Role Design and Calibration Engine 120, the user may be assigned the corresponding entitlements associated with the assigned role. The Role Design and Calibration Engine 120 may allow an administrative or other type of managerial user to directly assign one or more entitlements to an individual user using, for example, an administrator interface. In some alternative implementations, the Role Design and Calibration Engine 120 may also be configured to automatically assign one or more entitlements to an individual user.

We define and identify five key performance indicators ("KPIs") as being particularly useful in assessing the current quality of a role. These five KPIs are: in-role access; out of role ("OOR") access; missing entitlements ("MER") access; unused access; and users in the enterprise role ("ER").

The in-role access KPI is a measurement of the percentage of the permissions or access rights that a user possesses which fall within their designated role or job responsibilities. The OOR access KPI is a measurement of the percentage of the permissions or access rights that a user possesses which fall outside their designated role or job responsibilities. The MER access KPI is a measurement of the extra entitlements that a user would obtain upon being assigned a specific role they would not possess otherwise. The unused access is a measurement of the number of entitlements in a given role that is not currently being used. The users in ER are a measurement of the total number of users who have been assigned a given role.

Within the Role Design and Calibration Engine 120, a first KPI evaluation engine 121 evaluates and produces scores for each KPI for a role. A second KPI evaluation engine 122 sits functionally on top of the first KPI evaluation engine 121 within the Role Design and Calibration Engine 120 and assesses all the KPIs together to derive an overall role quality score ("RQS") for a particular role based on the KPI scores. The KPI evaluation engines 121, 122 are treated as separate items, for purposes of example and understanding, but it is to be understood that their operation could be unified in some implementations. The KPI evaluation engine 121, 122 may execute on a computing platform such as a Linux-based host, and may be implemented using scripting languages such as Python; however, other operating systems and programming environments may alternatively be employed. Based on the quality score, the Role Design and Calibration Engine 120 will provide an indication of the overall health of the role (e.g., excellent, needs attention, or can be improved) and suggest to the administrative/managerial operator of the Role Design and Calibration Engine 120 any next action to be taken with respect to the role.

Data pertaining to users' identity, enterprise roles and entitlements and users for each enterprise role, users' accesses and usage of enterprise resources, users' roles and entitlements, and KPI values of enterprise roles are stored in a database 130 and can be retrieved by the Role Design and Calibration Engine 120 as needed. In some implementations, the database 130 can be a database system that also stores and retrieves data requested by other devices 105 or software applications of the enterprise networked system 100.

Figure 2:
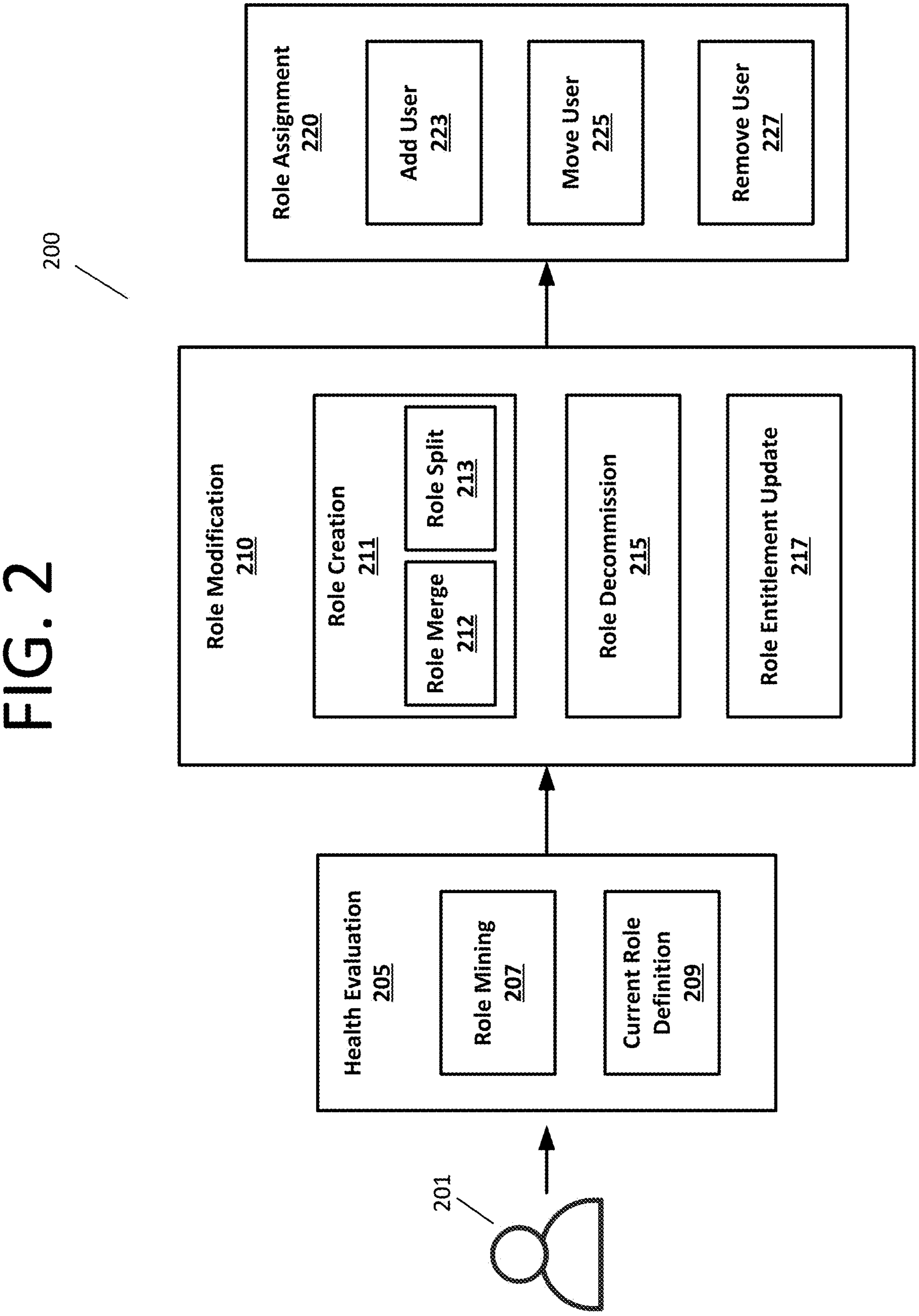
FIG. 2 illustrates, in simplified form, one example of a high-level flow diagram of the operation of the enterprise Role Design and Calibration Engine.

FIG. 2 illustrates, in simplified form, one example of a high-level flow diagram 200 for the operation of the Role Design and Calibration Engine 120. Typically, a role is assigned to users who are all members of a department or a sub-department within the enterprise. Typically, the operator 201 of the Role Design and Calibration Engine 120 is the manager of the department or sub-department that owns the particular role being evaluated by the Role Design and Calibration Engine 120. The operator 201 can assess the roles and any individual entitlements assigned to users who report to the operator 201. The operator 201 can use the Role Design and Calibration Engine 120 to regularly manage the accesses of his/her direct report users to keep the risk profile low. By performing the role assessment on a department or sub-department basis, instead of on an enterprise-wide basis, the amount of data that needs to be accessed from the database 130 and assessed by the Role Design and Calibration Engine 120 is scaled down.

The first step 205 is to evaluate the health of the existing roles that have been previously mined as already assigned to the users within the department or sub-department managed by the operator 201 by methods well known in the art. The operator 201, on a schedule, preferably on a weekly basis, will assess the accesses (i.e., entitlements) possessed by all the users within his/her department or sub-department and their actual usage of the resources to which they are granted access by the entitlements. The need to assess the users' entitlements and usage on a frequent basis is attributable to three continually evolving circumstances: (1) that the users may need to be assigned additional entitlements outside of his/her currently assigned role; (2) organizational changes that affect entitlements (e.g., users are moving in/out of the enterprise, departments split, departments created, new managers come in, etc.); and (3) applications that users have previously had access to change (e.g., new functions added and/or new features rolled out).

Within health evaluation (step 205), role mining (step 207) is performed using conventional methods. In role mining 207, the Role Design and Calibration Engine 120 assesses the commonality of entitlements and resource usage among all of the users within the department or sub-department of the enterprise. Any user which does not have any commonality with any other user is an outlier. A cluster of users having commonality of entitlements and usages is identified as a community presenting a possible new role. This newly identified community is compared with the currently existing enterprise roles within the same department or sub-department (step 209). The Role Design and Calibration Engine 120 then proceeds to role modification (step 210) which involves taking one or more actions, with respect to the roles, based on the results of this comparison.

Within role modification (step 210), if there is no existing role for the community of users identified by role mining (step 207), a new role is created by the Role Design and Calibration Engine 120, along with a list of users to be assigned that new role (step 211). In some implementations, a new role may also be created by merging two or more existing roles (step 212) or by splitting an existing new role into multiple new roles (step 213). Additionally, based on the result of health evaluation (step 205), where there are one or more existing roles with less than a predefined amount of similarity with any new roles, the Role Design and Calibration Engine 120 may suggest decommissioning one or more existing roles (step 215). In some implementations, the Role Design and Calibration Engine may be configured to automatically decommission one or more existing roles. The Role Design and Calibration Engine 120 may also adjust an existing role by adding and/or deleting one or more entitlements assigned to the role to better match a risk profile (step 217) set by the enterprise. For instance, if a resource is no longer being used by the users in that role, the entitlement to that resource should be deleted from the role to match the risk profile. In some implementations, the risk profile could be a qualitative label (e.g., low, medium, high), a numerical score (e.g., 0-100), or any other custom metric defined by the enterprise to quantify the potential impact and likelihood of misuse associated with a user, role, or entitlements.

Once the appropriate action(s) on the role have been taken through role modification (step 210), the Role Design and Calibration Engine 120 moves to adjusting users in and out of the role as appropriate (step 220). The Role Design and Calibration Engine 120 can bring one or more new users within the role (step 223), move one or more users to different role(s) (step 225) and/or remove users from the role (step 227).

FIG. 3 illustrates one simplified example of a user interface that can be used for automated role assessment within the system of FIG. 1, according to some embodiments of the present disclosure. Referring to FIG. 3, the user interface 300 of the Role Design and Calibration Engine 120 shows one example "Enterprise Role Design and Calibration Tool" that analyzes entitlement and usage data across a specified subpopulation of the enterprise and displays the results thereof. In the example of FIG. 3, presume for purposes of example only, that the specified subpopulation is a Private Wealth Management Department (which is within the Field Management Home Office Super Department of the Wealth Management Field Division) and the operator 201 of user interface 300 is the manager of the Private Wealth Management Department. The header 301 indicates that the "number of users" in the Private Wealth Management Department is 64, which is the total count of users within the department who possess any of the entitlements assigned to that department.

The user interface 300 displays an "ER Name" field 302 which lists the enterprise roles assigned to the selected department using, for example, the descriptive name assigned to each such role. In the example of FIG. 3, the roles assigned to the Private Wealth Management Department are: Complex Risk Officer; Complex Manager Assistant; Complex Business Development Officer; and Complex Business Service Officer. The "ER ID" field 303 lists a unique identifying number assigned to the adjacent corresponding role listed in "ER Name" field 302.

The user interface 300 also displays the scores for each of the five KPIs for each role assigned to the selected department. In the example of FIG. 3, for the Complex Risk Officer role, an "In-Role Access" field 304 shows an 80% score for the In-Role Access KPI, which indicates that 80% of the accesses of resources today by users assigned to the role were made under an entitlement that is part of that role. An "OOR Access" field 305 shows a 20% score for the Out-Of-Role KPI for the Complex Risk Officer role, which indicates that 20% of the accesses of resources today by users assigned to the role were made under an individually-added entitlement that is not part of that role. A "MER Access" field 306 indicates the number of entitlements that were made part of a particular role package but the users in that role never actually received that access, and shows that one entitlement is missing from the Complex Risk Officer role. If there is an entitlement that is part of a role but the users in that role never received that access, that entitlement should be removed from the role. An "Unused Access" field 307 shows that two entitlements in the Complex Risk Officer role are not currently being used. A "Users in ER" field 308 shows that six users in the Private Wealth Management Department have been assigned the Complex Risk Officer role.

The user interface 300 also optionally displays an "Insights" field 310 which provides specific details about the role, for example, whether any entitlements should be added/deleted from the role, and/or whether any users can be added/removed from the role as shown, the insights for the Complex Risk Officer role are: "Map Entitlements to ER (2)" which suggests that two new entitlements should be added to the role; "Unmap Users from ER (1)" which suggests that one existing user should be removed from the role; and "Unmap Entitlements from ER (2)" which suggests that two existing entitlements should be removed from the role. The insights of Complex Manager Assistant have a "Map Users to ER (2)" which indicates that two new users from the Private Wealth Management Department should be added to the Complex Manager Assistant role because the role mining (step 207) suggests that they are part of the community but have not been given this role. The insights of Complex Business Development Officer indicate "Merge Duplicate/Similar role" which suggests to combine the current role with another role. The insights of Complex Business Service Officer indicate "Decommission role" which indicates the current role should be removed.

The user interface 300 also displays an "Additional User Groups Found" field 320 reports on any additional roles that were derived based on the role mining (step 207). Examples of that changed circumstances that may give rise to the creation of new roles during the mining step 207 include the hiring of new people, drastic change in job function for some users (e.g., they were promoted or demoted), a new function was acquired within the department, etc. In the example of FIG. 3, two potential new roles, "Private_wealth_management_analyst" and "Private_wealth_management_manager" are listed along with their initial scores for the in-role access, OOR access, MER access and user in role KPIs.

Figure 4:
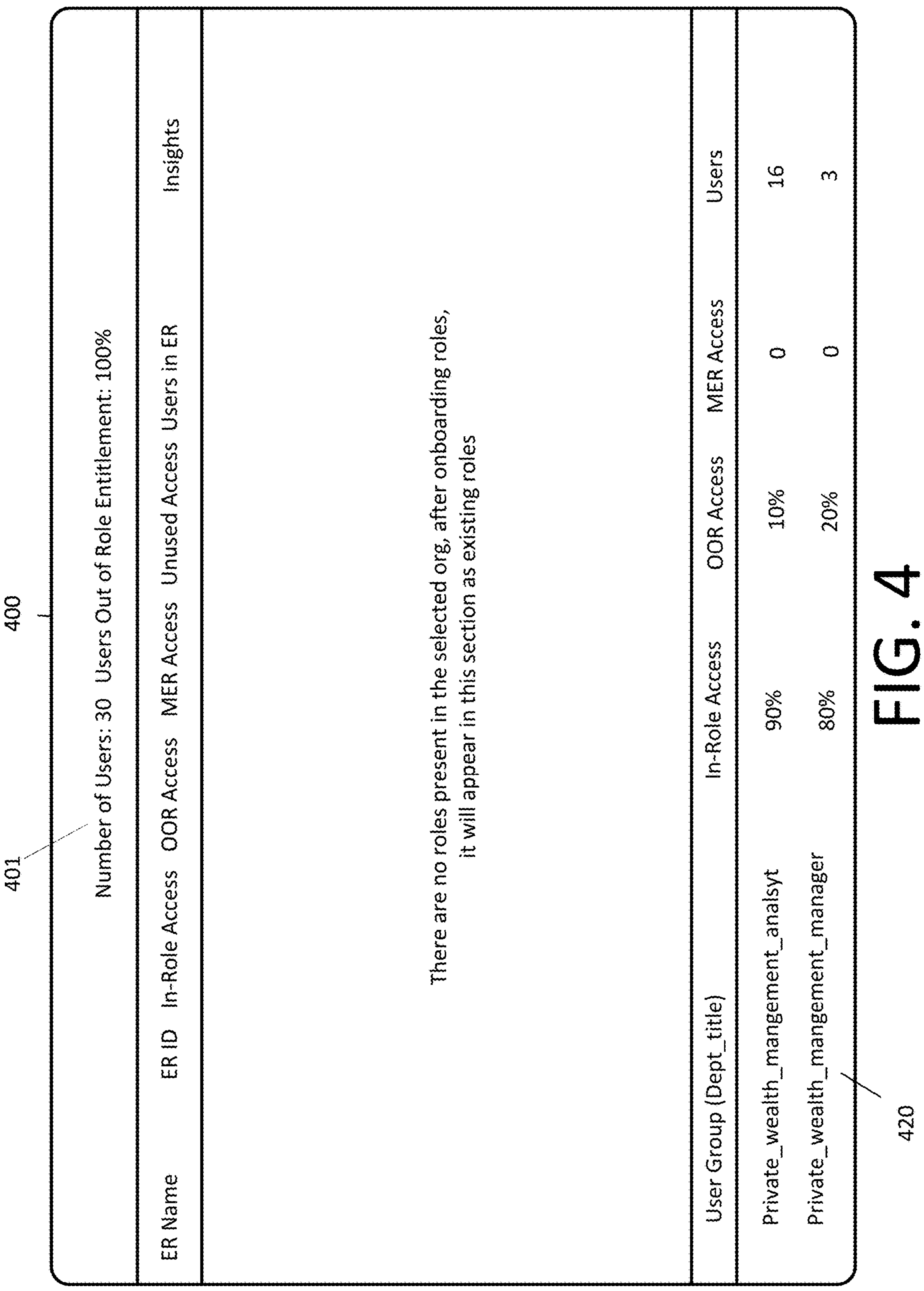
FIG. 4 illustrates an alternative simplified example of a user interface that can be used for automated role assessment within the system of FIG. 1.

FIG. 4 illustrates an alternative simplified example of a user interface that can be used for automated role assessment within the system of FIG. 1. In FIG. 4, the user interface 400 illustrates a screenshot from the "Enterprise Role Design & Calibration Tool" application for a case where a department is newly created and/or has never had any assigned roles. The header 401 indicates that the "number of users" in the department is 30, and that 100% of those users' entitlements are outside of any role. An "Additional User Groups Found" field 420 lists two potential new roles, more specifically, the roles "Private_wealth_management_analyst" and "Private_wealth_management_manager," which were derived based on the role mining (step 207), along with their initial scores for the in-role access, OOR access, MER access and user in role KPIs. The number of users assigned to these two proposed roles totals 19, thereby suggesting that the remaining 11 users in the department are outliers.

Figure 5:
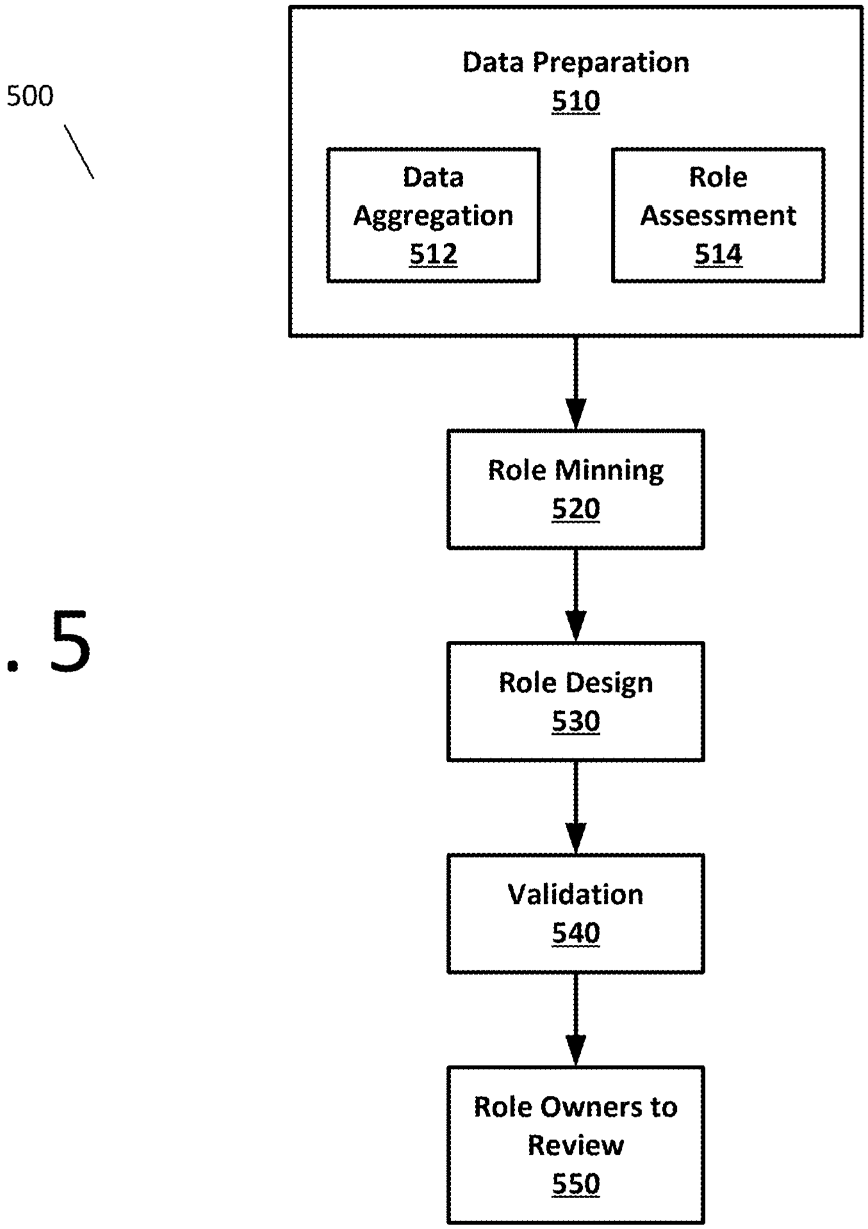
FIG. 5 illustrates, in simplified form, one example of a process flow diagram for the operation of the enterprise Role Design and Calibration Engine.

FIG. 5 illustrates, in simplified form, one example of a process flow diagram 500 for the operation of the enterprise Role Design and Calibration Engine 120. All of the process steps illustrated in FIG. 5 are performed when the operator 201 assesses his department's roles, and the assessment is preferably performed on a weekly basis.

The process begins with data preparation (step 510), more specifically, data regarding the existing roles, all the existing user entitlements, the alignment of the department and organization, and the alignment of applications including each application's functions, usage and metadata are aggregated (step 512). As described above in connection with FIG. 1, this data is stored and updated in the database 130 and accessed by the at least one processor 126 in the Role Design and Calibration Engine 120. Role Assessment (step 514) is performed within data preparation (step 510) as well, the score for each KPI for the role is calculated by the first KPI evaluation engine 121. The second KPI evaluation engine 122, in this example implementation, then scores of all the KPIs together to derive an overall role quality score ("RQS") for a particular role. Based on the overall role quality score, the Role Design and Calibration Engine 120 categorizes the overall health of the role (e.g., excellent, needs attention, or can be improved).

In Role Mining (step 520), graph partitioning techniques are used to reveal clusters or communities of users based on similarities of entitlements and usage of resources, using the aggregated data (step 512). As a result, each cluster of users satisfying differing similarity thresholds of entitlements and usages is identified as a community presenting a possible new role.

In Role Design (step 530), newly identified communities are compared with the currently existing enterprise roles within the same department. If there are no existing roles for the communities of identified users (step 520), one or more new roles would be created by the Role Design and Calibration Engine 120, along with a list of users to be assigned each such role. In some implementations, a new role may be created by merging two or more existing roles or by splitting an existing new role into multiple new roles. Additionally, the Role Design and Calibration Engine 120 may suggest decommissioning one or more existing roles. The Role Design and Calibration Engine 120 may also adjust an existing role by adding and/or deleting one or more entitlements assigned. Once the appropriate action(s) on the role have been taken, the Role Design and Calibration Engine 120 moves to adjusting users in and out of the role as appropriate.

In Validation (step 540), the KPIs for the proposed new role(s) are calculated by the first KPI Engine 121 and then evaluated by the second KPI Engine 122 to determine if the overall role quality score criterion is satisfied for the proposed new role. If the proposed new role satisfies the overall role quality score criterion for all of the enterprise roles, the proposed new role is forwarded to the operator 201 for his/her consideration (step 550) using, for example, the user interface 300 via the Additional User Groups Found field 320.

Figure 6:
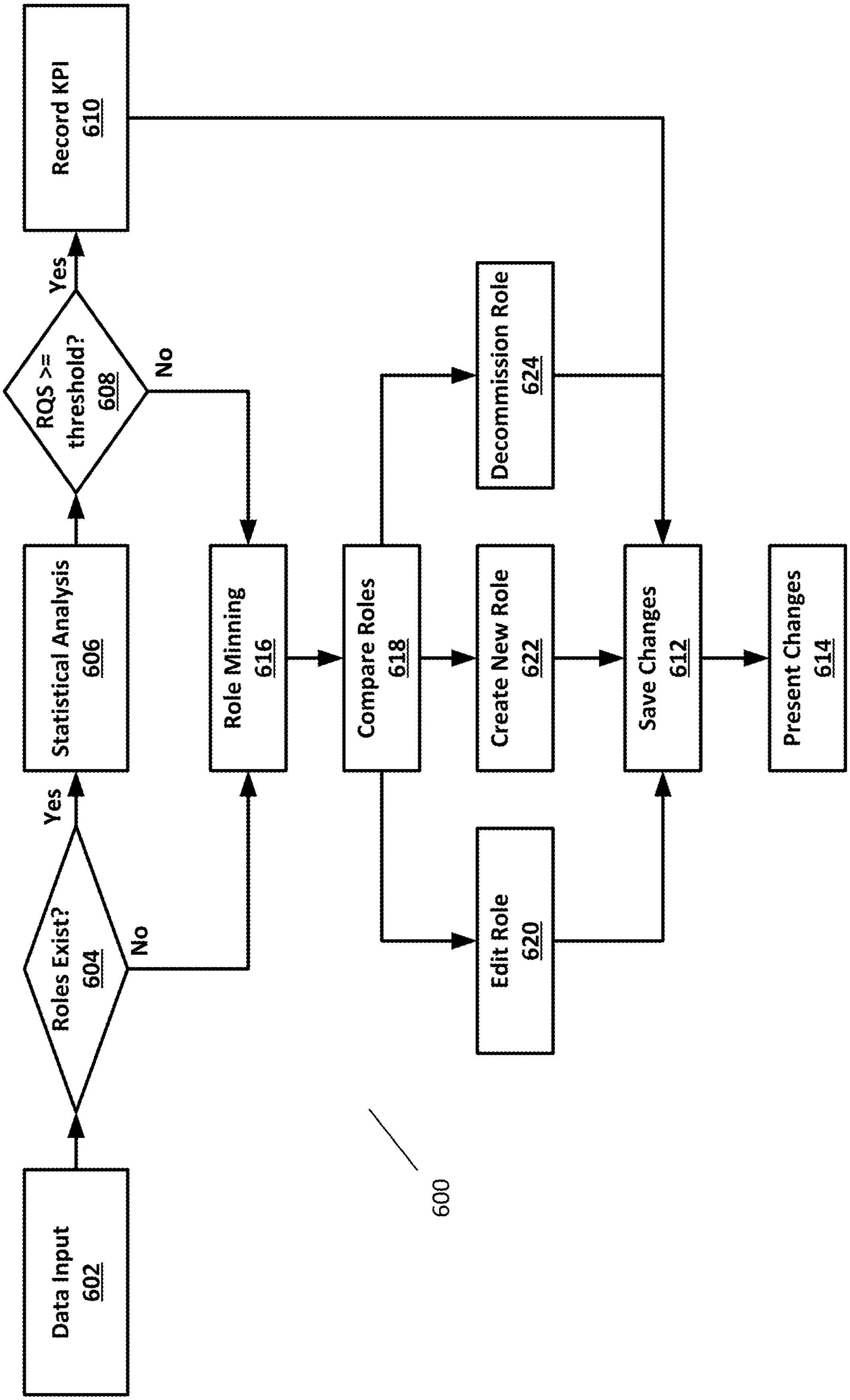
FIG. 6 illustrates, in simplified format, one example, according to the teachings herein, of a high-level technical flow diagram for the operation of the enterprise Role Design and Calibration Engine.

FIG. 6 illustrates, in simplified format, one example, according to the teachings herein, of a high-level technical flow diagram 600 for the operation of the enterprise Role Design and Calibration Engine 120.

First, data regarding all existing users within a department, the existing roles within the department, all existing user entitlements, all accesses of resources by the existing users, the alignment of the department and organization, and the alignment of applications including each application's functions, usage and metadata is input into the database 130 (step 602).

Then, the Role Design and Calibration Engine 120 retrieves data from the database 130 and determines whether the department has any existing assigned roles (step 604). If the department has existing roles, a statistical analysis is performed on each existing role (step 606). The individual score for each KPI for an existing role is calculated, for example, as follows:

Out of Role (OOR)=User Entitlement set-Role Entitlement set

In-role=User Entitlement Set∩Role Entitlement set

Missing Entitlement from Role (MER)=Role Entitlement set-User Entitlement set

Unused Entitlement=User entitlements not used for 180 days or more

User_count=Number of users in a role

Then, the scores of all the KPIs are assessed together to derive an overall role quality score ("RQS") for the existing role. The values for MAX_OOR_PCT, MAX_MER_PCT, MAX_Unused_PCT are preconfigured in the second KPI evaluation engine 122 by the enterprise, department, or sub-department. The following values are examples of formulas used to calculate the overall role quality score using the individual KPI values calculated by the first KPI evaluation engine 121, as follows:

Normalized_OOR_Ratio=(MAX_OOR_PCT−AVG_OOR_PCT)/MAX_OOR_PCT

Normalized_MER_Ratio=(MAX_MER_PCT−AVG_MER_PCT)/MAX_MER_PCT

Normalized_Unused_Ratio=(MAX_Unused_PCT−AVG_Unused_PCT)/MAX_Unused_PCT

User_Score=0 if User_count<=1; 5 if User_count>1 and <=5; and 10 if User_count>5

The final role quality score (RQS) is calculated as follows:

RQS=30*Normalized_OOR_Ratio+30*Normalized_MER_Ratio+30*Normalized_Unused_Ratio+User_Score In general, the final role quality score (RQS) can have a maximum value of 100.

The RQS value is then evaluated (step 608). If the overall RQS value for the role is greater than or equal to some pre-specified threshold, for example, 60, no further action need be taken on the role and the current score for each KPI for the role is recorded and tagged (step 610) and stored in the database (step 612) for reporting to the operator 201 via user interface 300 (step 614) in the "In-Role Access" field 304, "OOR Access" field 305, "MER Access" field 306, "Unused Access" field 307, and "Users in ER" field 308.

If the department does not have an existing role, or if the RQS value for the role is less than 60, role mining is performed (step 616). In role mining, partitioning techniques are used to graphically reveal clusters or communities of users based on similarities of accesses, or usage, of resources, using the aggregated data that was stored in the database 130. A cluster of users having a sufficient level of similarity of accesses based on entitlements and usage of resources is identified as a community, defining a potential new role. It is to be understood that the threshold value of 60 is one exemplary value, and other threshold values for RQS may be used depending on system configuration, enterprise policy, or user preference.

If the department has one or more existing roles, the potential new role is compared to the existing roles (step 618). Based on this comparison, the existing roles may be maintained as is or, alternatively, adjusted (step 620). The Role Design and Calibration Engine 120 may adjust an existing role by adding and/or deleting one or more entitlements assigned. Once the appropriate action(s) on the role have been taken, the Role Design and Calibration Engine 120 may adjust users in and out of the role as appropriate. Based on the comparison of the potential new role to the existing roles, if there is no existing role for the community of users identified at role mining (step 616), a new role, and its assigned entitlements, is created by the Role Design and Calibration Engine (step 622), along with a list of users to be assigned that new role. This new role may be created by merging two or more existing roles or by splitting an existing new role into multiple new roles. Based on the comparison of the potential new role to the existing roles, the Role Design and Calibration Engine 120 may suggest decommissioning one or more existing roles (step 624).

The proposed changes to the roles at steps are saved to the database (step 612), and are presented to the operator 201 (step 614) for his/her consideration using user interface 300 via the Additional User Groups Found field 320.

Figure 7:
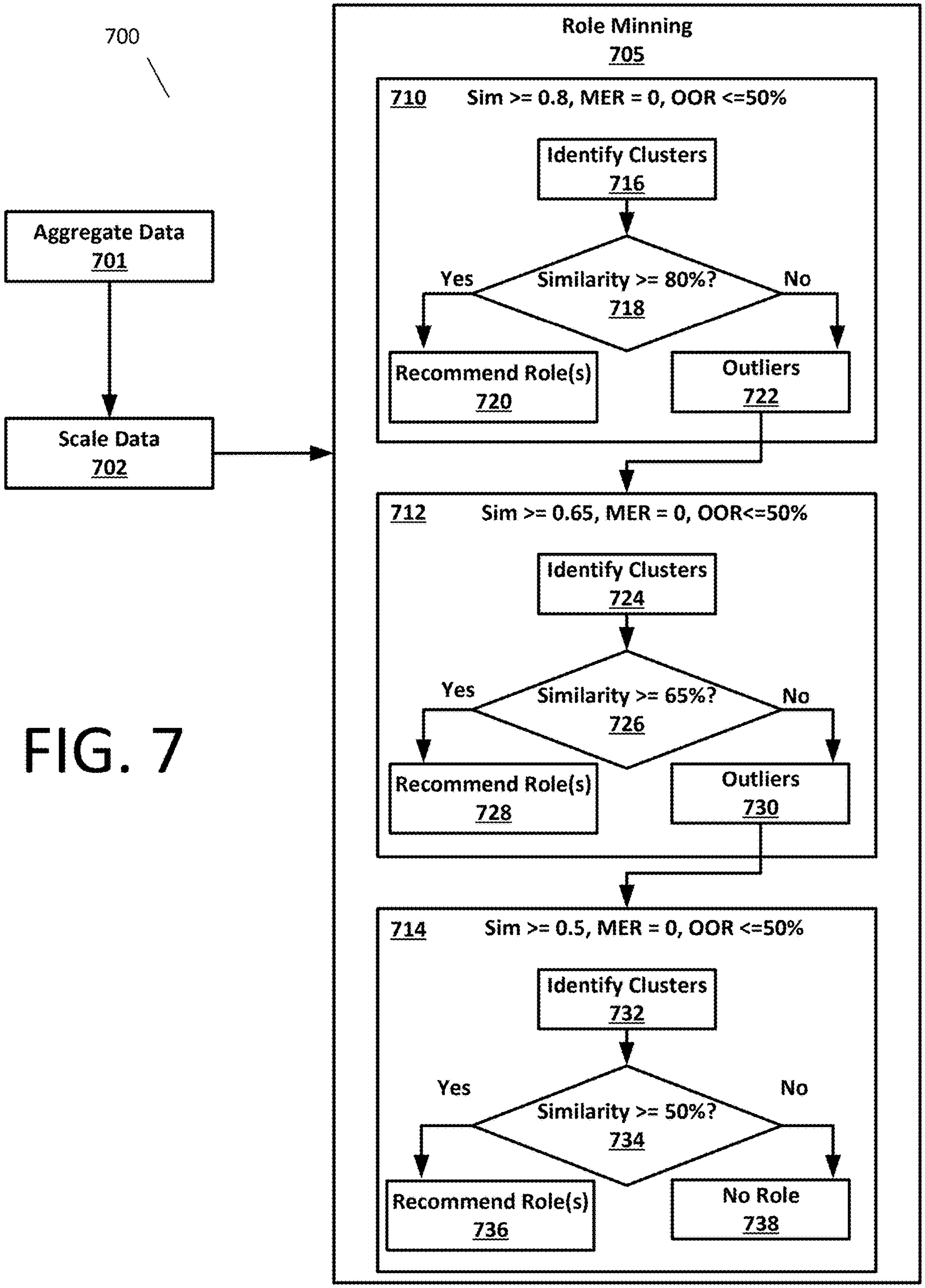
FIG. 7 illustrates, in simplified format, one example, according to the teachings herein, of a technical flow diagram for the role mining aspect of the operation of the enterprise Role Design and Calibration Engine.

FIG. 7 illustrates, in simplified format, one example, according to the teachings herein, of a technical flow diagram 700 for the role mining aspect of the operation of the enterprise Role Design and Calibration Engine 120. As explained previously, at a high level, in role mining, graph partitioning techniques are used to reveal clusters or communities of users based on similarities of accesses, or usage, of resources.

The present depiction includes three separate role mining models (described further below) that differ based on the threshold level of similarity of accesses required to be present to identify a user community. Each role mining model will identify one or more communities. Where an enterprise is vast in terms of the number of users, a single role mining model may not fit all needs because of the diversity in the enterprise and functions. It is to be understood the following depiction is for purposes of understanding only and is only one possible implementation of the role mining process. In alternative implementations, more or less role mining models might be used, with differing threshold level of similarity of accesses required.

The process begins when aggregated data stored in the database 130 is retrieved (step 701) and scaled down to the department level of the enterprise (step 702). Role mining is then performed to identify one or more clusters of users having a sufficient level of similarity of accesses are identified as a user community, defining a potential new role (step 705).

When role mining is performed, the role mining models are performed in decreasing order of required similarity of access. A first role mining model 710 is used in which it requires a minimum 80% similarity of accesses among the users (i.e., Sim=0.8) and a zero value for the missing entitlements from the role (i.e., MER) KPI for there to be a community. A second role mining model 712 is used for outliers from the first role mining model 710 in which a minimum 65% similarity of accesses among the users (i.e., Sim=0.65) and a zero value for the MER KPI is required for there to be a community. Then, for remaining outliers, a third role mining model 714 is used which requires a minimum 50% similarity of accesses among the users (i.e., Sim=0.5) and a zero value for the MER KPI for there to be a community.

The first role mining model 710 searches for, and identifies, any clusters of users having a similarity of 80% or greater of their accesses to enterprise resources (step 716). The minimum number of users in an identified potential new role is two, and the maximum out of role entitlements for the identified potential new role is 50%. The similarity is then evaluated (step 718). Each cluster of two or more users having a similarity of 80% or greater in their accesses is identified as a separate potential new role if the MER KPI value for the potential new role equals zero and the maximum OOR KPI value=50%. If satisfied, the Role Design and Calibration Engine 120 will recommend to the operator 201 that such a potential new role should be created into an new role (step 720). Those users which do not share 80% similarity of accesses to enterprise resources with any other user within the department are deemed to be an outlier for this 80% role mining model at step 722.

Next, the second role mining model 712 is executed for those users that were identified as being outliers for the first role mining model 710. That is, the second role mining model 712 searches for, and identifies, any clusters of users having a similarity of 65% or greater in their accesses to enterprise resources (step 724). Again, the minimum number of users in an identified potential new role is two, and the maximum out of role entitlements for the identified potential new role is 50%. The similarity is then evaluated (step 726). Each cluster of two or more users having a similarity of 65% or greater of their accesses is identified as a separate potential new role if the MER KPI value for the potential new role equals zero and the maximum OOR KPI value=50%. In such a case, the Role Design and Calibration Engine 120 will recommend to the operator 201 that such a potential new role should be created into a new role (step 728). The users who do not share 65% similarity of accesses to enterprise resources with any other user within the department are again deemed to be an outlier for this 65% role mining model (step 730).

Finally, the third role mining model 714 is executed for on those users that were identified as being outliers by the second role mining model 712. That is, the third role mining model 714 searches for, and identifies, any clusters of users having a similarity of 50% or greater of their accesses to enterprise resources (step 732). Yet again, the minimum number of users in an identified potential new role is two, and the maximum out of role entitlements for the identified potential new role is 50%. The similarity is then evaluated (step 734). Each cluster of two or more users having a similarity of 50% or greater of their accesses is identified as a separate potential new role if the MER KPI value for the potential new role equals zero and the maximum OOR KPI value=50%. If so, the Role Design and Calibration Engine 120 will recommend to the operator 201 that such a potential new role should be created into a new role (step 736). Those users who do not share 50% similarity of accesses to enterprise resources with any other user within the department are then deemed to be an outlier and at this point are not assigned to a role (step 738). Such, if any, outliers may be manually calculated and assigned one or more entitlements on an individual basis.

Figure 8:
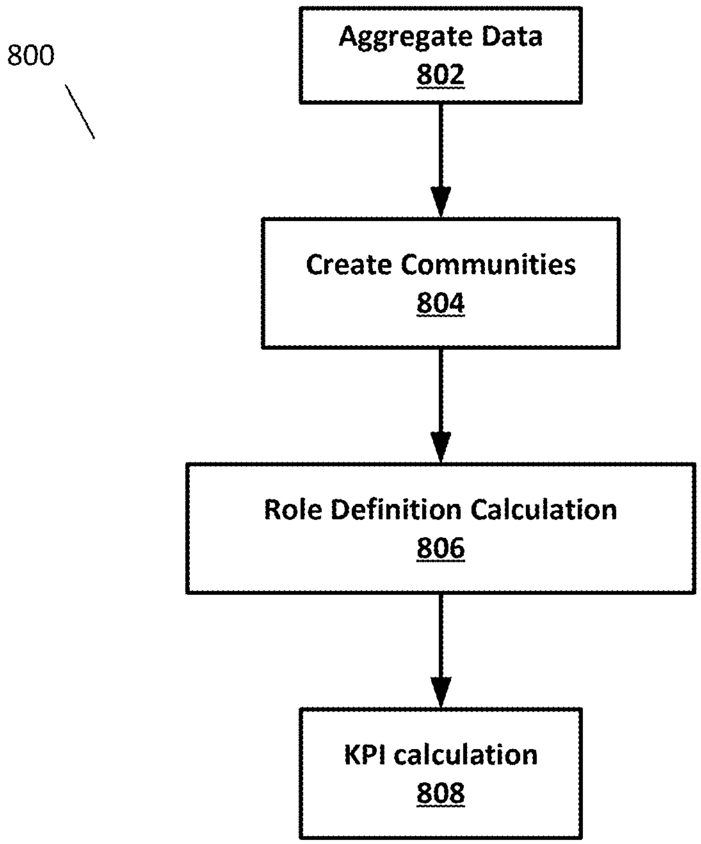
FIG. 8 illustrates, in simplified format, a more detailed example, according to the teachings herein, of a technical flow diagram for the role mining machine learning model aspect of the operation of the enterprise Role Design and Calibration Engine.

FIG. 8 illustrates, in simplified format, a more detailed example, according to the teachings herein, of a technical flow diagram 800 for the role mining machine learning model aspect of the operation of the enterprise Role Design and Calibration Engine 120, of FIG. 7 (step 705). First, the Role Design and Calibration Engine 120 retrieves data, scaled down to the department level of the enterprise, regarding the existing roles, all the existing user entitlements, the alignment of the department and organization, and the alignment of applications including each application's functions, usage and metadata from the database 130 and aggregates it (step 802).

Next, the role mining machine learning model of the Role Design and Calibration Engine 120 examines the users within an enterprise department and their accesses to create communities of users (also refer to as "partitions") (step 804) using, in some implementations, the well-known Louvain graph partitioning algorithm, based on the users' similarity of accesses to enterprise resources. The Louvain method for community detection is an optimization method intended to extract non-overlapping communities from large networks. The Louvain algorithm starts by forming a singleton partition in which each node (i.e., user) is in its own community. The algorithm moves individual nodes from one community to another until a partition is formed based on the optimization of the modularity of the communities.

The similarity of users' accesses to enterprise resources is scored using, in some implementations, the well-known Jaccard index. The Jaccard index measures the similarity between finite sample sets and is defined as the size of the intersection divided by the size of the union of the sample sets. The value of the Jaccard index ranges from 0 to 1 (or 0 to 100%). For example, assume User1 and User2 both have ten total entitlements, with eight of those entitlements being in common and the two remaining entitlements for both users being completely different and separate entitlements. Thus, the intersection of User1's entitlements and User2's entitlements is 8, and the union of User1's entitlements and User2's entitlements is 12, yielding a Jaccard index similarity score of 0.666 (or 66.6%).

The Louvain graph partitioning algorithm yields a cluster (partition) of users who satisfy the desired Jaccard index similarity score (e.g., 80%, 65%, 50%, etc.), as measured on the Jaccard index scale, and other outliers who have a lower Jaccard index similarity score for accesses to enterprise resources than the users within the community, and are not a member of that community.

Each partition acts as a potential new role for users who satisfy the desired similarity threshold of accesses. For example, if the desired Jaccard index similarity is 80%, each partition would then have users with a Jaccard index similarity score of at least 80%, when comparing their set of entitlements against another user's set of entitlements within the same partition.

Role definitions are then calculated for each group of users formed from the partitions (step 806). In some implementations, role definition comprises of at least one of job title, functional title, and job code. Additionally, role definitions comprise of entitlements appropriate for each group of users resulted from partitioning, based upon the partition result.

Finally, KPI's are calculated for each group of users such as In-Role Access, OOR, MER, Unused Entitlements, and total users (step 808). The result of the KPI calculation is an enterprise role for each group of users formed through the partitions with each enterprise role comprising corresponding role definitions and KPIs.

Figure 9:
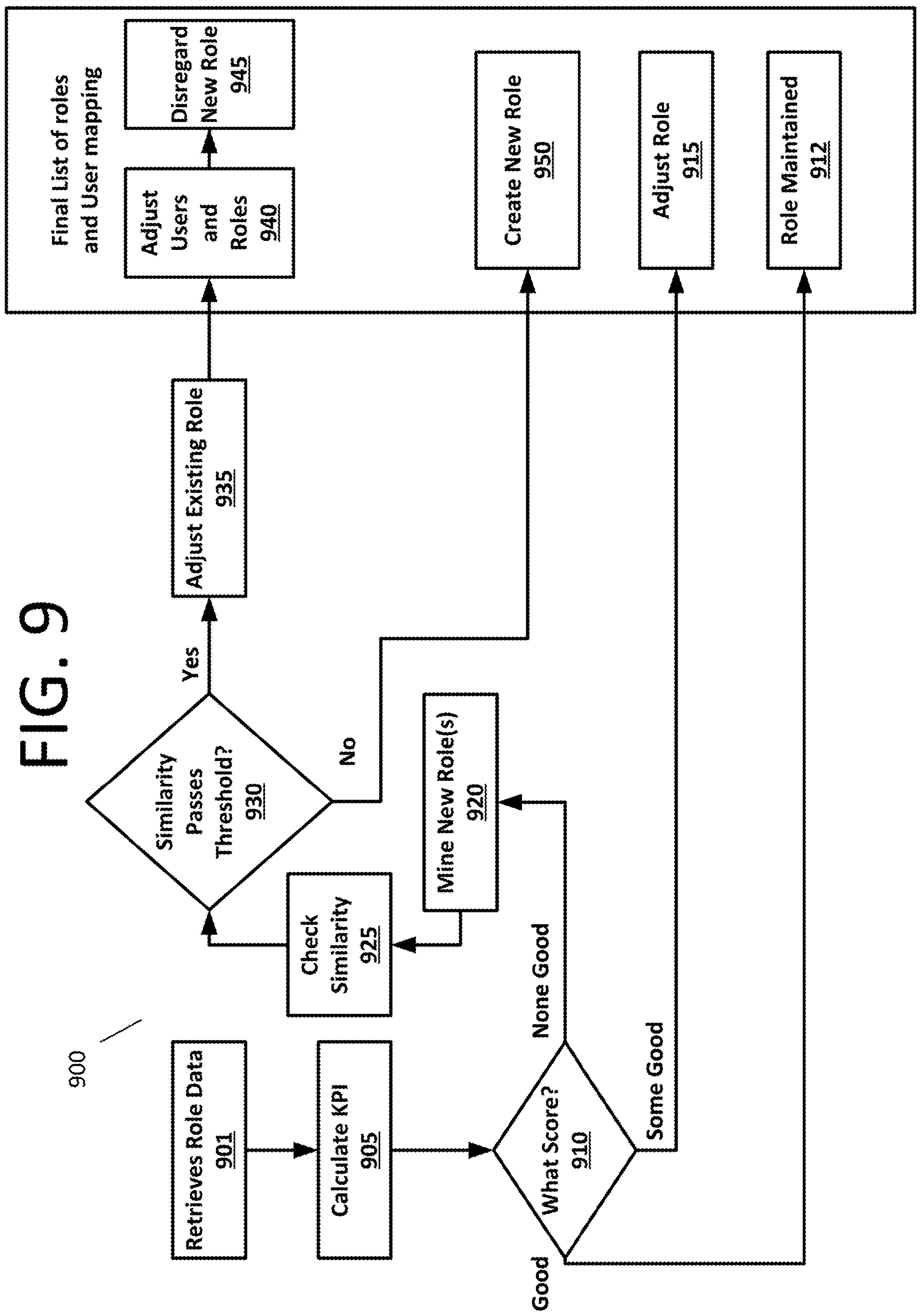
FIG. 9 illustrates, in simplified format, one example, according to the teachings herein, of a technical flow diagram for the role comparison aspect of the operation of the Role Design and Calibration Engine.

FIG. 9 illustrates, in simplified format, one example, according to the teachings herein, of a technical flow diagram 900 for the role comparison aspect of the operation of the Role Design and Calibration Engine 120. More specifically, the role comparison flow depicted pertains to the determination performed by the Role Design and Calibration Engine 120 as to whether a new role needs to be created, or if it will suffice to adjust an existing role somewhat to make that role more effective.

First, the Role Design and Calibration Engine 120 retrieves pertinent data regarding an existing role from the database 130 (Step 901). The Role Design and Calibration Engine 120 then calculate the OOR, MER and Entitlement Usage KPI values for that existing role (step 905). The Role Design and Calibration Engine 120 assesses those KPI values for that existing role to derive a score, and to determine an action to be done based upon the score (step 910).

In some implementations, if the values for all three KPIs are "good," that existing role is maintained as is (step 912). KPI values considered "good" may be defined differently from organization to organization. For example, one organization may consider values such as OOR <=30%, MER <=20%, USAGE >=60% all as "good", while other organizations may consider only 2, 1 or none of the presented values as "good".

If the values for just one or two KPI values are "good," the existing role may need to be adjusted somewhat to make that role more effective (step 915). In such a case, the Role Design and Calibration Engine 120 may adjust an existing role by adding and/or deleting one or more entitlements assigned. Once the appropriate action(s) on the role have been taken, the Role Design and Calibration Engine 120 may adjust users in and out of the role as appropriate.

If none of the values for the three KPIs are good, the Role Design and Calibration Engine 120 recognizes the need for potentially decommissioning the existing role and proceeds to mine new role(s) (step 920). The one or more new roles are mined in the manner described above in connection with FIG. 8.

Once role mining is performed, the Role Design and Calibration Engine 120 performs a similarity check comparing the existing role in which none KPI values were good and the newly mined role (step 925). The similarity of entitlements and users between the existing role and the newly mined role are checked during the comparison to see if both passed a pre-specified threshold (step 930). The threshold may vary from implementation to implementation. For example, for one implementation, if the similarity of entitlements between the existing role and the newly mined role is 60% or greater and there is greater than 50% common users between the existing role and the newly mined role using the Jaccard index for scoring, the existing role will be retained and adjusted (step 935). These percentage thresholds can be modified based on the needs and preference of the enterprise, department, or sub-department. The Role Design and Calibration Engine 120 may adjust an existing role by adding and/or deleting one or more entitlements assigned to the existing role. Once the appropriate action(s) on the entitlements assigned to the existing role have been taken, the Role Design and Calibration Engine 120 may adjust users in and out of the role as appropriate (steps 940) and subsequently discard the newly mined role (step 945).

For example, assuming existing Role A comprises entitlements p, q, r, s, and t and users x, y, and z, and newly mined Role B comprises entitlements p, q, r, and t and users x, y, z, and w, the Role Design and Calibration Engine 120 calculates an entitlement similarity score of 80% and a common user similarity score of 75% using the Jaccard index methodology for calculating both similarity scores. Next, the Role Design and Calibration Engine 120 would delete entitlements from the existing Role A resulting in entitlements p, q, r, and t for the altered existing Role A and then would add user w to the altered existing Role A resulting in users x, y, z, and w. Then, the Role Design and Calibration Engine 120 would discard the newly mined Role B.

If the similarity of entitlements or users between the existing role and the newly mined role did not pass the pre-specified threshold, the existing role will be removed and the Role Design and Calibration Engine 120 will recommend to operator 201 that the newly mined role should be created into a new role (step 950).

In certain scenarios, after roles have been created, assigned to users, and assessed on a periodic basis and adjusted as necessary, there may be a need to assign an existing role to new users/employees that are continually coming into and leaving the enterprise.

Figure 10:
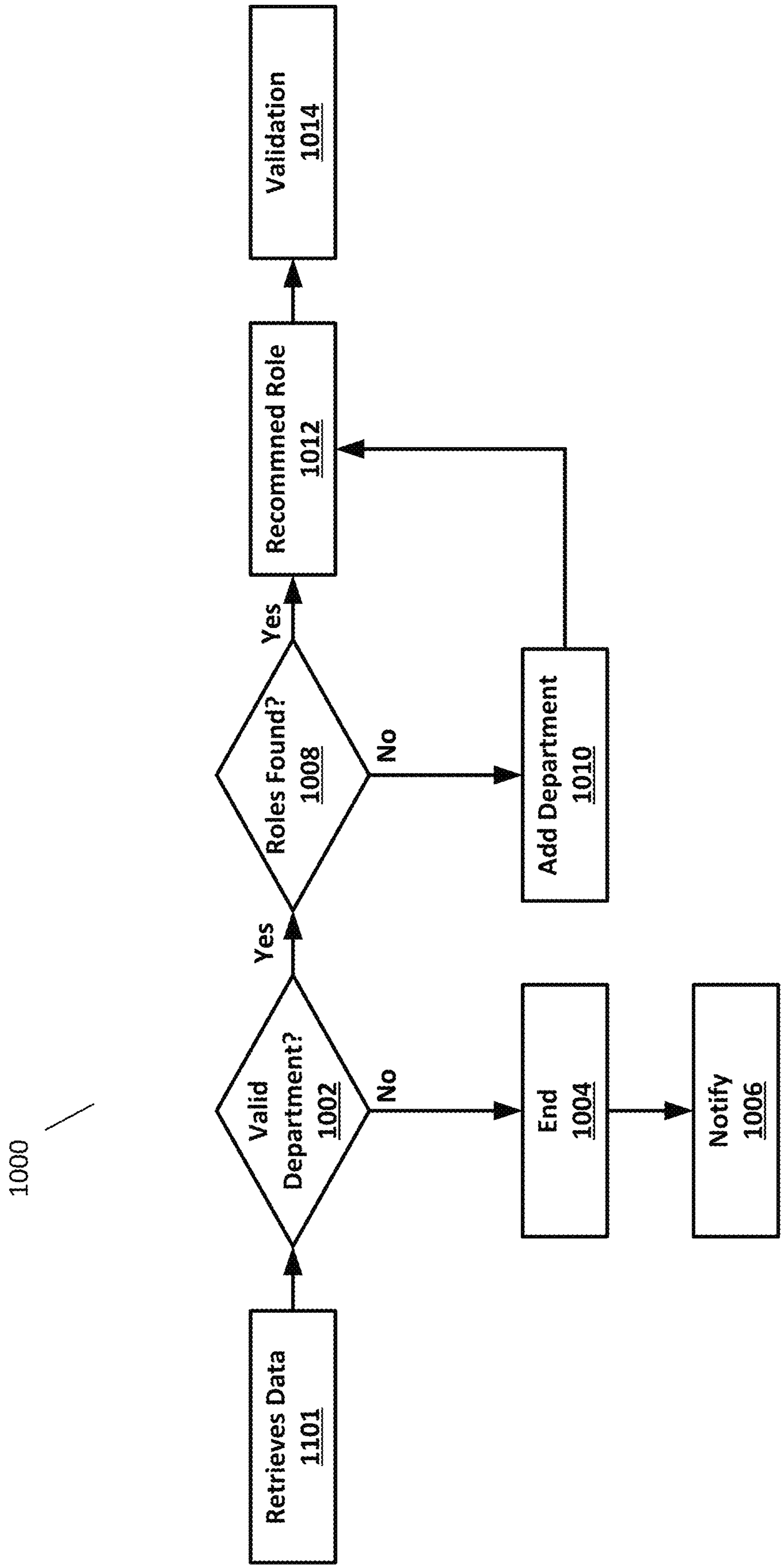
FIG. 10 illustrates, in simplified format, one example, according to the teachings herein, of a technical flow diagram for the assignment of a role to a new employee using the Role Design and Calibration Engine.

FIG. 10 illustrates, in simplified format, one example, according to the teachings herein, of a technical flow diagram 1000 for the assignment of a role to a new employee using the Role Design and Calibration Engine 120.

First, the Role Design and Calibration Engine 120 retrieves pertinent data regarding the new employee (step 1001) from database 130 such as the new employee's user ID, job code, job functions, country of job location, assigned department, manager's identity, and existing entitlement roles for that department. The Role Design and Calibration Engine 120 then assesses whether the new employee's assigned department is a valid department (step 1002). If the new employee's assigned department is an invalid department, the process ends (step 1104) and a notification may be sent (step 1006) to the operator 201 indicating the invalidation. If the new employee's assigned department is a valid department, the department is then checked as to whether any roles exist for the new employee (step 1008). If no roles for the new employee are present for that department, the employee's department is added for future role mining cycles (step 1010). If a role is present for the new employee's department, the role is recommended for the new employee (step 1012). In some implementations, a role that is considered a recommended role is based upon being an exact match between the role's department to the new employee's department, where the role comprising the same set of entitlements as the new employee (i.e., MER=0), and the new employee's manager is an owner of the role, or at least a peer of the new employee (i.e., another user reporting to the same manager) belongs to the role.

Finally, a validation process is performed to ensure that the recommended role makes sense for the new employee (step 1014). For example, if the recommend role satisfies the success criteria for the KPIs defined by the organization, the recommended role is sent to an approver for the new employee, otherwise it is not approved.

The present approaches may be implemented as, depending upon the specific implementation, automatically approved as a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device receives computer readable program instructions from the network and forwards the computer readable program instructions for storage in a computer readable storage medium within the respective computing/processing device.

The aspects as set forth herein are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The foregoing outlines, generally, the features and technical advantages of one or more implementations that can be constructed based upon the teachings in this disclosure in order that the following detailed description may be better understood. However, the advantages and features described herein are only a few of the many advantages and features available from representative examples of possible variant implementations and are presented only to assist in understanding. They are not to be considered limitations on the invention as defined by the appended claims, or limitations on equivalents to the claims. For instance, some of the advantages or aspects of different variants are mutually contradictory, in that they cannot be simultaneously present in a single embodiment. Similarly, some features or advantages may be applicable to one aspect and inapplicable to others. Thus, the foregoing features and advantages should not be considered dispositive in determining equivalence. Additional features and advantages, although not detailed herein, will be apparent from the teachings of the description, drawings, and claims.

What is claimed is:

1. An identity and access management method, comprising:

storing, in a database, data including user identity attributes, enterprise roles, enterprise resource entitlements for each enterprise role, users for each enterprise role, enterprise resource-usage events for each user, and key performance indicators;

retrieving, using a processor-based role design and calibration engine, a set of enterprise roles from the database;

computing using the processor and data from the database including enterprise resource-usage events data, for each enterprise role, key performance indicators including at least three of an in-role access percentage, an out of role access percentage, a missing entitlement count, an unused entitlement count, or a user count;

deriving, for each enterprise role, a role quality score, using the key performance indicators;

if the role quality score of an enterprise role is equal to or above a threshold, the enterprise role will be kept and the key performance indicators will be stored in the database; and if the role quality score of one or more enterprise roles of the set of enterprise roles is below the threshold, mining for one or more potential new enterprise roles, comparing the one or more potential new enterprise roles to the set of enterprise roles, and proposing at least one change based on a result of the comparison.

2. The identity and access management method of claim 1, wherein, when the role quality score is below the threshold, the method includes automatically implementing the at least one change.

3. The identity and access management method of claim 1, wherein the mining for one or more potential new enterprise roles comprises:

using a Louvain graph partitioning algorithm to create communities of users for the one or more potential new roles.

4. The identity and access management method of claim 3, further comprising filtering out users based on a similarity of accesses by users to enterprise resources using the Louvain graph partitioning algorithm.

5. The identity and access management method of claim 4, further comprising using a Jaccard index to score the similarity of accesses by users.

6. The identity and access management method of claim 1, wherein the at least one change includes at least one of:

integrating some or all of the one or more potential new enterprise roles, decommissioning one or more enterprise roles of the set of enterprise roles, merging two or more enterprise roles of the set of enterprise roles, splitting one or more enterprise roles of the set of enterprise roles, or adjusting entitlements to one or more enterprise roles of the set of enterprise roles.

7. The identity and access management method of claim 1, wherein the computing of key performance indicators and the mining for one or more potential new enterprise roles are performed on a repeated schedule.

8. The identity and access management method of claim 1, wherein the deriving the role quality score comprises:

normalizing individual key performance indicators, and combining the normalized values using predetermined weights.

9. An identity and access management system, comprising:

a database configured to store data including user identity attributes, enterprise roles, enterprise resource entitlements for each enterprise role, users for each enterprise role, enterprise resource-usage events for each user, and key performance indicators;

a role design and calibration engine comprising a processor and non-transitory memory coupled to the processor, the non-transitory memory containing programming that will cause the processor to:

retrieve a set of enterprise roles from the database;

compute, using data from the database including resource-usage data, for each enterprise role, key performance indicators including at least three of an in-role access percentage, an out of role access percentage, a missing entitlement count, an unused entitlement count, or a user count;

derive, for each enterprise role, a role quality score, using the key performance indicators;

if the role quality score of an enterprise role is equal to or above a threshold, the enterprise role will be kept and the key performance indicators will be stored in the database; and if the role quality score of one or more enterprise roles of the set of enterprise roles is below the threshold, the role design and calibration engine will mine for one or more potential new enterprise roles, compare the one or more potential new enterprise roles to the set of enterprise roles and propose at least one change based on a result of the comparison.

10. The identity and access management system of claim 9, wherein the processor is further configured to automatically implement the at least one change.

11. The identity and access management system of claim 9, further comprising a Louvain graph partitioning algorithm usable to create communities of users for the one or more potential new roles.

12. The identity and access management system of claim 11, wherein the Louvain graph partitioning algorithm further filters out users based a similarity of accesses by users to enterprise resources.

13. The identity and access management system of claim 12, further comprising a Jaccard index usable to score similarity of accesses by users.

14. The identity and access management system of claim 9, wherein when the role quality score is below the threshold, the role design and calibration engine will perform at least one of:

integrate some or all of the one or more potential new enterprise roles, decommission one or more enterprise roles of the set of enterprise roles, merge two or more enterprise roles of the set of enterprise roles, split one or more enterprise roles of the set of enterprise roles, or adjust entitlements to one or more enterprise roles of the set of enterprise roles.

15. The identity and access management system of claim 9, further comprising a graphical user interface configured to concurrently display, to an operator, the set of enterprise roles, key performance indicators, and the proposed changes.

16. The identity and access management system of claim 9, wherein the role design and calibration engine is configured to:

compute the key performance indicators, and mine for the one or more potential new enterprise roles on a repeated schedule.

* * * * *